United States Patent [19]

Blanchard

[11] Patent Number: 5,738,747
[45] Date of Patent: Apr. 14, 1998

[54] METHOD OF MANUFACTURING A RECREATIONAL VEHICLE CABIN

[75] Inventor: Raymond W. Blanchard, White Lake, Mich.

[73] Assignee: Roamer Corporation, Auburn Hills, Mich.

[21] Appl. No.: 714,350

[22] Filed: Sep. 16, 1996

Related U.S. Application Data

[63] Continuation-in-part of Ser. No. 358,719, Dec. 19, 1994, Pat. No. 5,556,498.
[51] Int. Cl.$^6$ .............................. B29C 65/52; B62D 29/04
[52] U.S. Cl. .......................... 156/245; 156/292; 156/305; 264/250; 296/901
[58] Field of Search .................... 156/245, 292, 156/305, 228; 296/156, 181, 901; 264/517, 250, 309

[56] References Cited

U.S. PATENT DOCUMENTS

| | | |
|---|---|---|
| 3,084,973 | 4/1963 | Beckley .................... 296/156 |
| 3,271,224 | 9/1966 | Biernekull ................. 156/245 |
| 3,652,119 | 3/1972 | Hall . |
| 3,775,214 | 11/1973 | Winters ................... 156/245 |
| 3,811,141 | 5/1974 | Stoeberl . |
| 3,879,240 | 4/1975 | Wall ....................... 156/245 |
| 4,118,814 | 10/1978 | Holtom . |
| 4,314,726 | 2/1982 | Artweger . |

*Primary Examiner*—Daniel Stemmer
*Attorney, Agent, or Firm*—Young & Basile, P.C.

[57] ABSTRACT

The liner segments are removed from their respective molds and affixed to their respective interior shells while the interior shells are still mounted on their respective male molds. The resulting left and a right interior shell assemblies have exposed surfaces shaped to substantially match the contours of their respective exterior shells. Each male mold, with the interior shell assembly still attached, is then inserted into its corresponding female mold, which still contains the exterior shell, and the interior and exterior shells are secured to one another to form right and left cabin segments. The cabin segments are removed from their molds, placed in assembly frames, and substantially all interior finishing work, such as installing appliances and cabinet doors, is completed while the cabinet segments are separate. Finally, the cabin segments are brought together and joined along their edges to create a hollow, unitary cabin structure.

12 Claims, 9 Drawing Sheets

METHOD OF MANUFACTURING A RECREATIONAL VEHICLE CABIN

This application is a Continuation-in-Part of Ser. No. 08/358,719, now U.S. Pat. No. 5,556,498, filed Dec. 19, 1994.

FIELD OF THE INVENTION

The present invention relates to a recreational vehicle cabin structure mounted on an automotive vehicle such as a pick-up truck and more particularly to a method of producing a molded, unitary cabin structure from fiber-reinforced composite materials.

BACKGROUND OF THE INVENTION

The growing popularity of pick-up trucks, as evidenced by their increased percentage of total vehicle sales, has pointed out the need for a lightweight pick-up truck camper. The camper units currently available on the market, when fully equipped with appliances, are too heavy to be carried on the more popular full size pick-up trucks such as the Ford F-150, the best selling pick-up truck in the United States over the past several years. The pick-up campers available today, when equipped with a refrigerator, stove, toilet system, and water tank, weigh on the order of 1700 pounds, while the maximum weight capacity of the Ford F-150 is in the 1500 pound range.

While it would be advantageous to reduce the weight of a camper cabin, this is difficult to accomplish without sacrificing strength and rigidity. When the camper is mounted on the truck it derives substantial strength from the truck bed and chassis. But when removed from the truck bed and supported on jack stands or blocks the camper must still be rigid enough to withstand normal usage. This requirement has driven most prior camper designs to use a relatively heavy frame, usually made of metal, as the primary load-bearing portion of the cabin structure.

Another critical factor in the design of recreational vehicle cabins is cost, and this is directly related to the production technique used. To achieve low cost, the production method should involve the assembly of a minimum number of parts and should not require a great deal of skilled labor to assemble and finish the cabin.

Several previous camper designs have attempted to reduce weight by using fiber-reinforced plastic (FRP) as the main cabin material. U.S. Pat. No. 3,879,240 issued Apr. 22, 1975 utilizes an outer shell of FRP molded in several sections which are placed over a metal framework and bonded together with adhesive. Low density polyurethane foam insulation is then sprayed onto the inside of the shell in a thickness sufficient to cover the frame, with a thin second layer of high density polyurethane foam applied over the insulation to form the interior surface of the camper structure. This construction requires the fabrication of a relatively heavy and difficult-to-construct metal framework to provide the structure with rigidity. It also results in a somewhat uneven interior surface due to the inexact nature of the foam spraying process.

U.S. Pat. No. 3,652,119 issued on Mar. 28, 1972 discloses a telescoping camper cabin which pops up for use. Upper and lower cabin sections are produced, each consisting of an outer and an inner FRP shell with a metal framework trapped therebetween. Low density insulating foam fills the remaining space between the inner and outer shells. Again, the metal frame is the load-bearing portion of the structure.

In U.S. Pat. No. 4,314,726 issued Feb. 9, 1982 a cabin structure is disclosed that is made from a sandwich of rigid plastic foam between an outer skin of aluminum and an inner skin of wood. A high pressure forming process is required to produce this laminate, and many subsequent fabrication steps are needed to shape the material into a cabin structure.

Co-pending U.S. patent application Ser. No. 08/358,719, now U.S. Pat. No. 5,556,498 the disclosure of which is incorporated herein by reference, teaches a method of constructing a recreational vehicle cabin produced from laterally distinct halves. Each cabin half is formed by molding interior and exterior shells from FRP, removing the interior shell from its mold, applying a layer of polyurethane foam to the exposed inner surface of the exterior shell while it is still in its female mold, and placing the interior shell into the exterior mold to contact the layer of foam. The foam hardens as it cures and bonds the interior and exterior shells together into a cabin segment having a sandwich-type wall structure. The female molds containing the right and left cabin segments are brought together, and the segments are joined together while still in their female molds by applying joining material around the inside of the mated halves.

BRIEF SUMMARY OF THE INVENTION

It is an object of the present invention to provide a recreational vehicle cabin structure of unitary fiber-reinforced composite construction which is lightweight, strong and inexpensive to produce.

A more specific object is to provide a pick-up truck camper having walls of a sandwich-type construction in which inner and outer layers of fiber-reinforced plastic (FRP) are separated by a core of structural polyurethane foam.

In general these objectives are achieved by utilizing a construction process in which the cabin structure is produced in two laterally distinct segments before joining them into a unitary structure. After forming on their respective molds, the segments are mounted in separate assembly frames where substantially all interior assembly and fitting-out is completed on each segment. The assembly frames are then moved together to place the segments in contact with one another, and the segments are joined.

Each cabin segment is produced in at least two pieces: an exterior shell of FRP formed inside of a female mold, and an interior shell formed on a male mold. Each male mold is then inserted into its respective female mold to position the interior shell within and in spaced relationship to the exterior shell, and structural polyurethane foam SPF in an un-cured, fluid state is injected into the spaces between the shells. The foam solidifies as it cures and bonds the shells together to form cabin segments having thin, lightweight sandwich-type walls. Because the foam is injected and allowed to cure with the molds still in place to support and position the shells, the shells remain in very precise alignment with one another so that wall thicknesses and other dimensions of the cabin segments are closely controlled.

The cabin segments are then removed from their respective molds and placed on separate assembly frames which maintain the cabin segments in upright orientations. Interior components such as appliances, cabinet doors, and seat cushions are installed in the segments at this stage, while access to the interior of the segments is available through the open sides of the segments. The frames are preferably mounted on wheels, and may be rolled along an assembly line or between assembly stations within a plant for the sequential completion of various types of work.

The assembly frames are then moved together to place the perimeters of the open sides of the right and left cabin segments in abutting registry, and the two segments are joined along the centerline of the cabin. The frames rigidly and precisely support the cabin halves so that proper alignment during joining is assured.

According to a feature of the invention, joining of the two cabin segments is facilitated by forming the interior and exterior shells of relative sizes such that when the perimeters of the cabin segments abut one another, a gap remains between the peripheral edges of the interior shells. A layer of resin-impregnated fabric is placed over the seam between the exterior shells in this gap area, a layer of fluid SPF is applied to substantially fill the gap, then a rigid panel of FRP is placed over the foam to continue the sandwich construction of the wall into the gap area.

In the preferred embodiment described herein, the interior shell segments are molded to form the desired interior contours of the camper cabin such as counter tops, seating areas, storage cabinets, and appliance housings. Liner segments, also molded from FRP or some other plastic material, are secured to the back sides of the interior shells in various positions prior to insertion into the exterior shells. The liner segments form the inner layer of the sandwich wall structure in positions where the surface of the interior shells would not otherwise be close enough to the exterior shell to form the wall, such as where the interior shells are shaped to form cabinets or other storage spaces. Plumbing and electrical wiring components are also secured to the back sides of the interior shells and liner segments so that when they are placed in position inside of the exterior shells, the components will be properly located inside of the resulting wall structure.

As a further feature of the invention described herein, the male and female molds include flanges having locator holes and pins respectively. When the male mold is inserted inside the female mold, their respective flanges contact one another and the pins and holes come into mating engagement to precisely position the molds with respect to one another.

DETAILED DESCRIPTION OF THE PREFERRED EMBODIMENT

Figure 1:
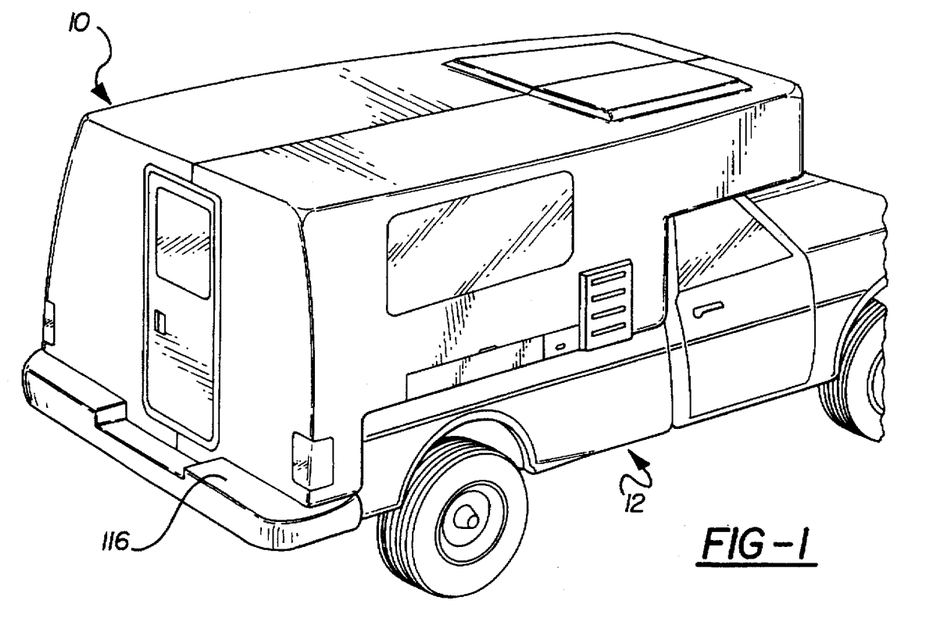
FIG. 1 is a perspective view of a camper cabin in accordance with the present invention mounted on a pick-up truck.

FIG. 1 shows the pick-up truck camper 10 of the present invention mounted for use on a pick-up truck 12.

Figure 2:
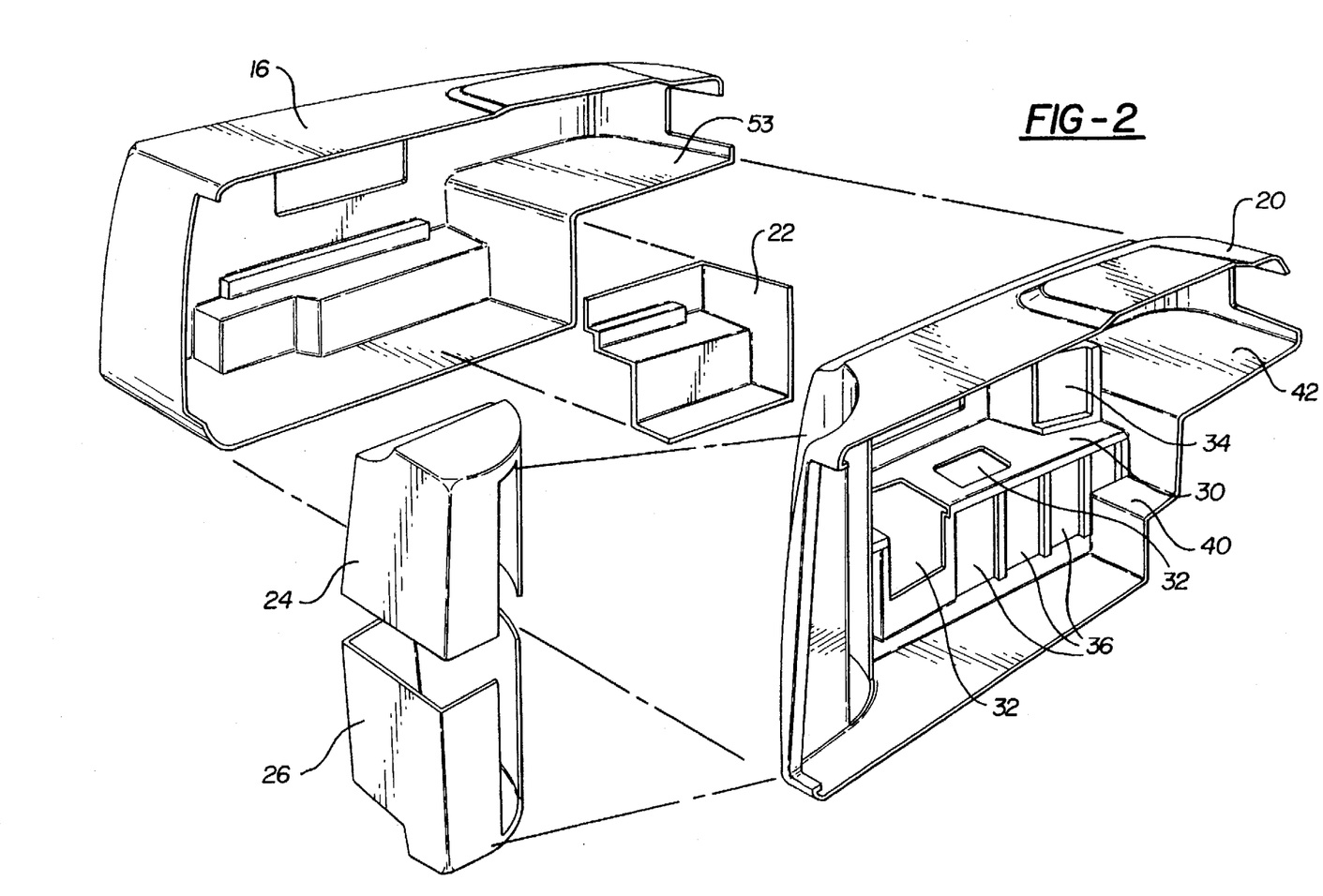
FIG. 2 is an exploded view of interior and exterior shells which together make up the left cabin half.
Figure 3:
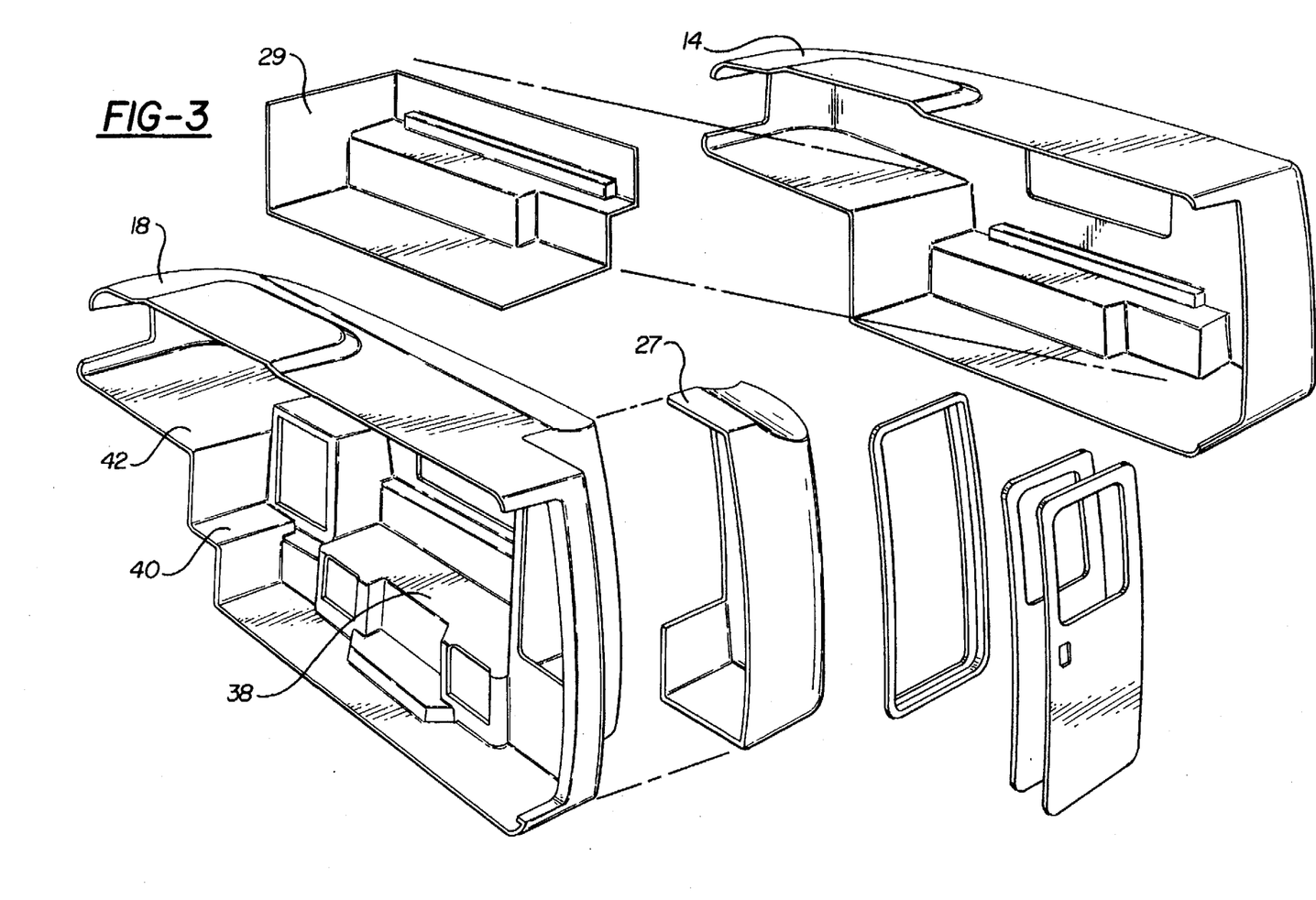
FIG. 3 is an exploded view of the interior and exterior shells which together make up the right cabin half.

The major structural components which make up camper 10 are shown in FIGS. 2 and 3. These include right and left exterior shells 14,16, right and left interior shells 18,20, cabinet liner segment 22, upper and lower bath enclosure liner segments 24,26, closet liner 27, and underseat liner 29. Left interior shell segment 20 is shaped to provide desired interior cabin contours such as a counter top 30 with openings 32 for the installation of a sink and a gas stove (not shown), upper cabinets 34 and lower cabinets 36. Right interior shell segment 18 is configured to include a seating area 38 for use with a fold away table (not shown) of the type commonly used in recreational vehicles and boats. When the fold away table is stowed, the seating area 38 may be converted to a bunk bed in a manner conventionally known in the recreational vehicle field.

The forward lower ends of interior shell segments 18,20 are shaped to provide a step 40 to assist passengers in climbing into the over-cab sleeping berth 42. The volume between step 40 and the inner surface of exterior shell segments 14, 16 houses a water tank (not shown) to supply the sink and the shower.

Cabin shells 14, 16, 18, 20 and liner segments 22, 24, 26, 27, 29 are molded from a fiber-reinforced plastic (FRP) material, preferably by a conventionally known spray forming technique wherein a polyester resin, a hardener, and strands of glass fibers are supplied to a spray gun. The resin and hardener are combined under pressure in the spray gun nozzle and the fiber strands are cut into short lengths (usually approx. 1 to 1½ inches) by a rotary cutting head in the nozzle, and the resulting mixture is sprayed onto a mold surface in a thin layer. Typically, a thin layer of gelcoat is applied to the mold surfaces prior to the FRP to yield a smooth surface on the finished molded parts.

Separate molds are constructed for each of the structural components which make up camper 10, concave female molds for the exterior shells and convex male molds for the interior shells and liner segments. The following description and FIGS. 4–6 relate to the fabrication of the left-hand cabin segment, but the process is generally applicable to the fabrication of the right-hand cabin segment as well.

Figure 4:
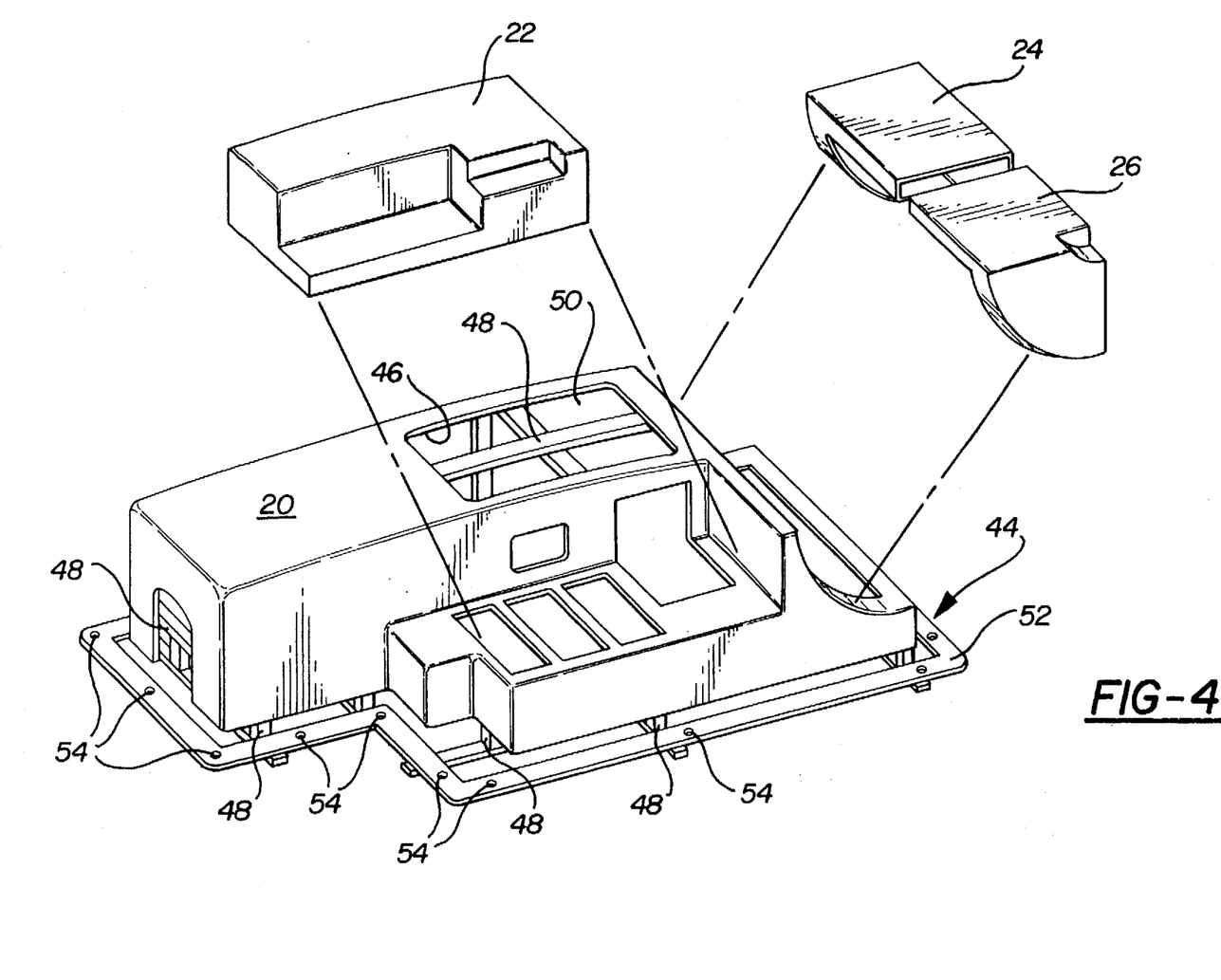
FIG. 4 is a perspective view of the interior shell for the left cabin segment on the left male mold, prior to attachment of the liner segments.

FIG. 4 shows a left male mold 44 with left interior shell 20 in place thereon as produced by the spray forming process. Left male mold 44 comprises a relatively thin outer skin 46 on which left interior shell 20 is formed, and internal bracing 48 rigidly supporting the skin. Skin 46 has several openings passing therethrough, including a side window opening 50, to permit the creation of apertures in desired locations during the formation of interior shell 20. A flange 52 is attached to internal bracing 48 and extends around substantially the entire periphery of mold 44. Locator holes 54 are formed at intervals around the length of flange 52.

Figure 5:
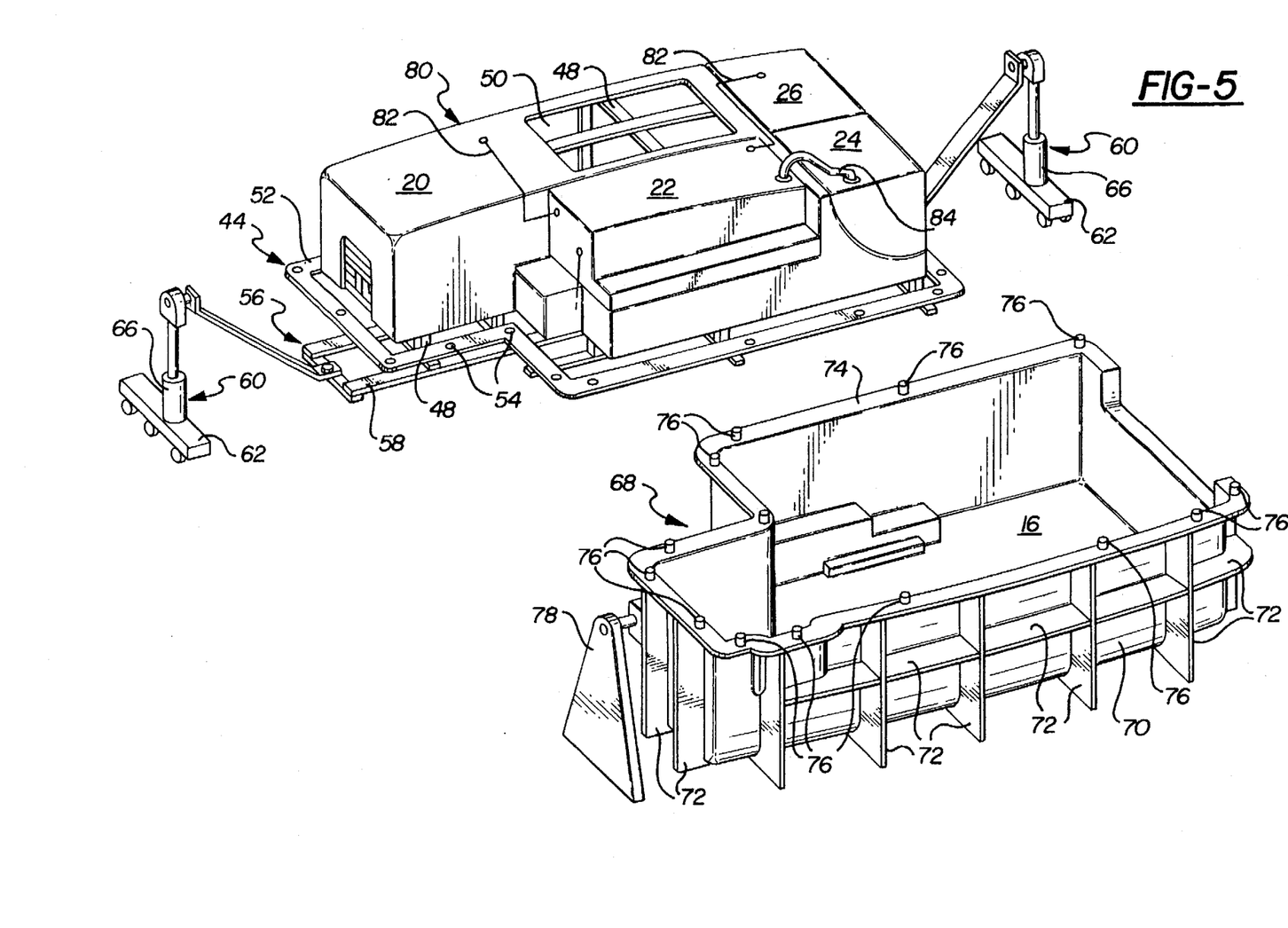
FIG. 5 is an overall view of the left female and male molds and molding fixtures with their respective shells in place.

Referring to FIG. 5, left male mold 44 is shown secured to a handling fixture 56 comprising a platform 58 pivotally supported at either by a pair of stanchions 60. Stanchions 60 are mounted on wheeled bases 62 and each stanchion includes a hydraulic lift cylinder 66 for raising and lowering platform 58.

Left female mold 68, shown in FIG. 5, comprises a relatively thin skin 70 defining the cavity in which left exterior shell 16 is formed and external bracing 72 to maintain the shape and dimensional accuracy of the skin. A flange 74 extends around the periphery of mold 68 and is attached to external bracing 72. Locator pins 76 project from flange 74. Female mold 68 is pivotally mounted to a pair of stands 78 which permit the mold to be rotated about a longitudinal axis.

During the spray application of FRP onto the surface of female mold 68, the mold may be pivoted about stands 78 to whatever orientation is necessary to permit the spraying to be directed downwardly onto near-horizontal mold surface. Application of a smooth, even layer of FRP is important to the appearance and strength of the finished shell, and this is facilitated by avoiding spraying the material onto vertical surface.

Liner segments 22,24,26 are formed in the conventionally known manner by spraying a layer of FRP onto appropriately shaped male molds (not shown).

Assembly of the Cabin Segments

After each of the cabin components has been formed in its respective mold and has cured sufficiently to permit handling, the assembly process begins with liner segments 22,24,26 being removed from their respective molds (not shown) and affixed to the exposed surface of interior shell 20 while the shell is still mounted on male mold 44. The liner segments are preferably attached to interior shell 20 with the same polyester resin used in the FRP which forms the components. Liner segments 22,24,26 mate with interior shell 20 in positions as indicated in FIG. 4 to produce an interior shell assembly 80, as shown in FIG. 5, having contours which substantially match the inner contours of exterior shell 16. Electrical wiring 82 and plumbing 84 are affixed to the surfaces of interior shell assembly 80 in the necessary locations at this stage of the fabrication.

After completion of interior shell assembly 80, male mold 44 is lifted onto platform 58 and secured thereto as shown in FIG. 5. Alternatively, it is possible to position male mold 44 on platform 58 at any time prior to completion of shell assembly 80 and execute the remaining steps while the mold is pivotably mounted thereon. Male mold 44 may be lifted onto platform 58 by means of, for example, a fork lift or an overhead crane (not shown).

Figure 6:
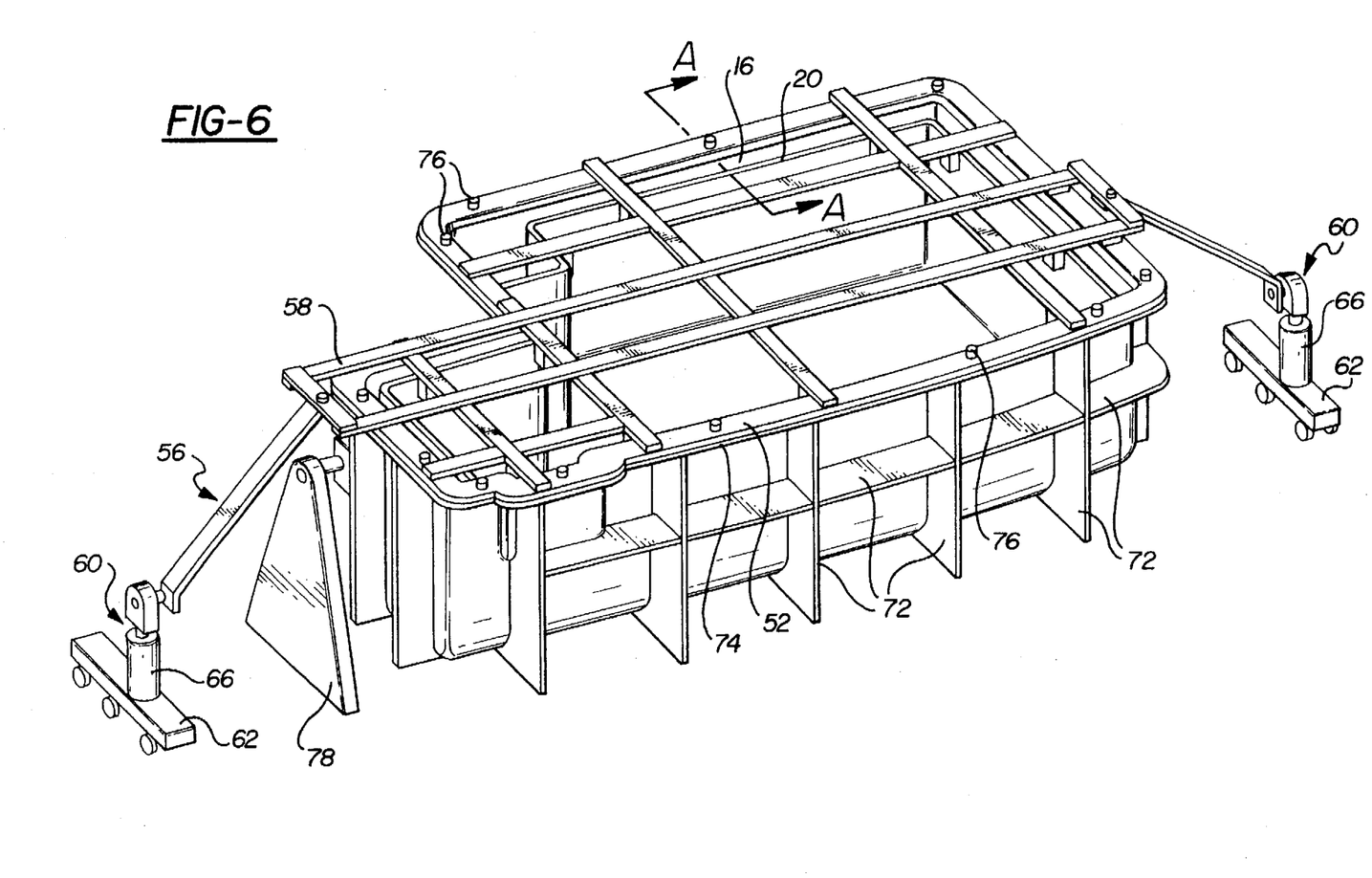
FIG. 6 is a perspective view of the molds and fixtures of FIG. 5, showing the male mold and interior shell inserted into the female mold and exterior shell.

Hydraulic lifts 66 are actuated to raise platform 58 and male mold 44 high enough to allow the mold to be rotated to an inverted position. Handling fixture 56 is then rolled to position male mold 44 directly over female mold 68, and the male mold is lowered into the female mold, as shown in FIG. 6, until female mold flange 74 and male mold flange 52 contact one another. Locator pins 76 on female mold flange 74 fit into locator holes 54 in male mold flange 52 to and align the molds and the attached shells precisely with respect to one another.

When the male and female molds are mated and aligned by the engagement between the flanges, the interior shell assembly is effectively suspended within the exterior shell so that the proximate surfaces of the two shells are separated by a small distance over all or most of the areas thereof.

The overall depth of interior shell 20 is less than that of exterior shell 16 by several inches. Accordingly, when the interior and exterior shells are in the desired spaced relationship, the upper edge or perimeter of interior shell 20 is recessed below the corresponding upper edge or perimeter of exterior shell 16 by several inches, as is best seen is FIG. 7.

Figure 7:
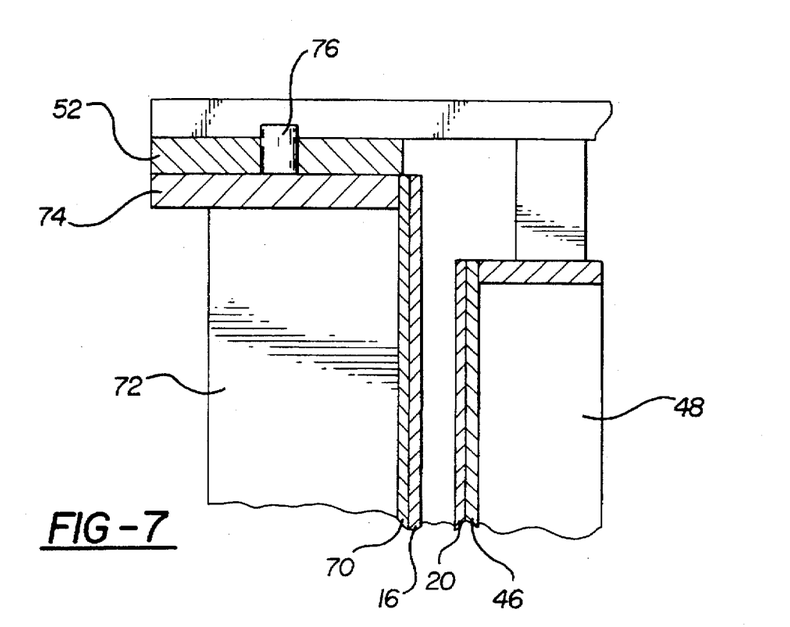
FIG. 7 is a cross-section through the mated molds and shells along line A—A of FIG. 6

A quantity of structural polyurethane foam (SPF) in a fluid, pre-cured state is injected into the spaces between interior shell assembly 80 and exterior shell 16 so as to essentially fill the spaces between the shells. When the SPF cures and hardens, it bonds the interior and exterior shells together to produce a rigid sandwich-type wall consisting of a core of SPF between two layers of FRP. The SPF should be formulated to exhibit a minimum amount of expansion from injection through full cure in order to achieve a high degree of accuracy in the finished product.

It has been found that it is advisable to perform the foam injection in at least two discrete steps. First, foam is injected downwardly into the peripheral gap between interior shell assembly 80 and exterior shell 16 in a quantity adequate to fill the spaces between the shells except those spaces between the lowermost horizontal shell surfaces when in the position shown in FIG. 6. The fluid foam is highly viscous so that it will not flow down into the lowermost space before it cures. After this first quantity of foam has partially cured and is rigid, a second injection of foam is made to fill the remaining spaces between the lowermost, horizontally lying shell surfaces. This second injection is made through the gap around the edge of side window opening 50. This two step foam injection process reduces the tendency that a single injection of pressurized foam would have to force interior shell assembly 80 upward out of female mold 68 before the foam cures.

In some portions of the cabin segments, the walls of the interior shell and the exterior shell do not lie close enough after mating to form the sandwich wall construction desired. In areas where this is the case, a reinforcing layer of FRP and/or foamcore material is hand-laid onto the inner surface of the exterior shell prior to the interior shell being inserted therein.

Completion of the Cabin Segments

After the foam has cured to the point where the shells are bonded together into a rigid unit, lift cylinders 66 are extended to lift male mold 44 and the attached left cabin segment 86 out of female mold 68. Release of cabin segment 86 from female mold 68 rather than male mold 44 may be achieved by providing pressure taps (not shown) which penetrate the female mold at several locations distributed over the mold surface. Air lines are attached to the pressure taps and compressed air is applied to exert pressure against the mold-side surface of exterior shell 16 and thereby free it from the female mold.

Figure 8:
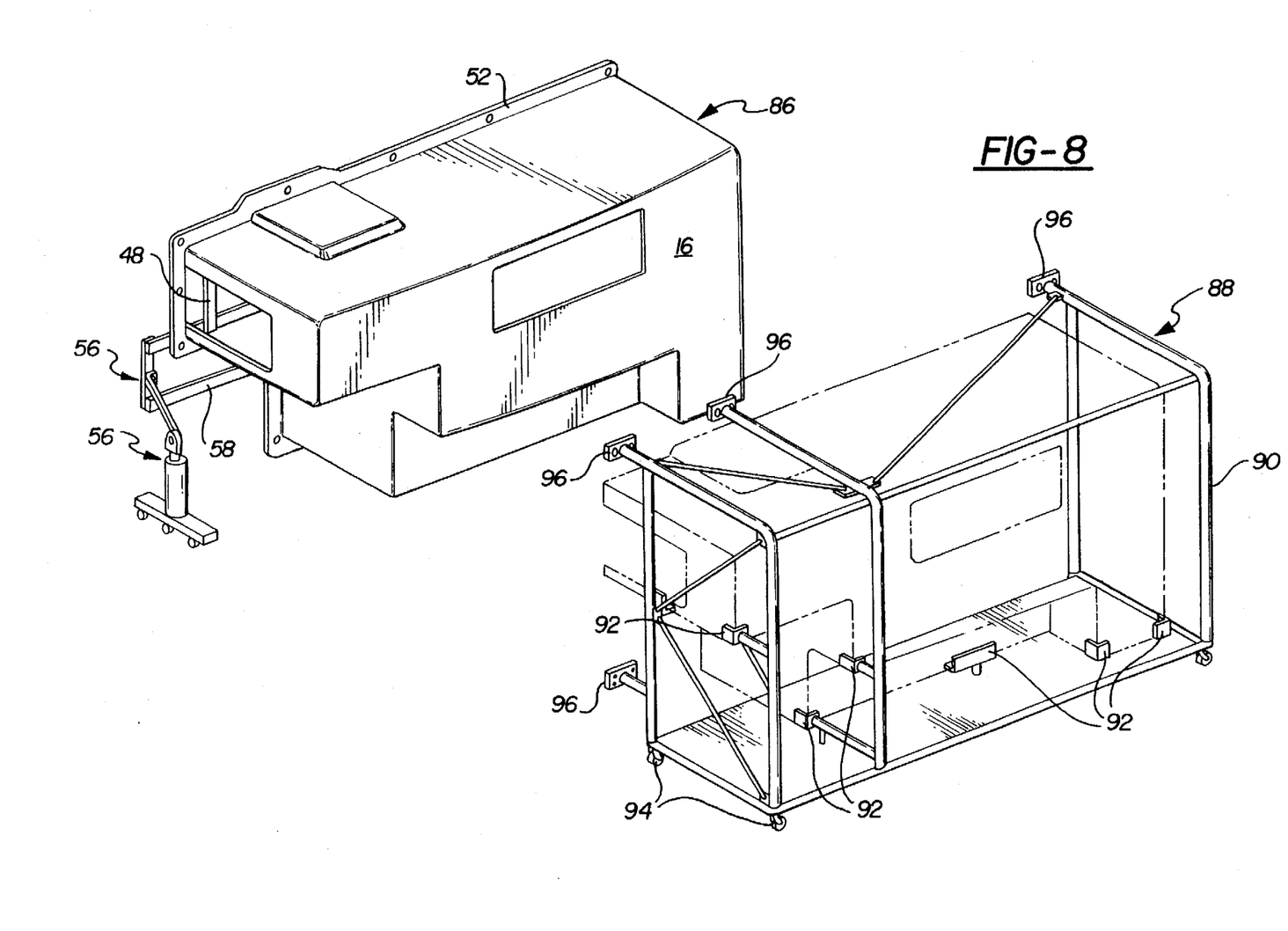
FIG. 8 is a perspective view of the left cabin segment after being lifted out of the female mold and about to be mounted on the assembly frame.

Handling fixture 56 is then rotated 90° to place cabin segment 86 in the upright position shown in FIG. 8, and the cabin segment is transferred to an assembly frame 88. The transfer is achieved by positioning assembly frame 88 parallel with handling fixture 56 and moving the two toward one another to place cabin segment 86 in the assembly frame as indicated in phantom lines in FIG. 8. Cabin segment 86 is then separated from the surface of male mold 44 and the mold is withdrawn from the cabin segment to leave the cabin segment in assembly frame 88. Pressure taps (not shown) may be provided on male mold 44 to facilitate removal of cabin segment 86. After removal of cabin segment 86, male mold 44 may be removed from handling fixture 56 and is ready for application of a layer of FRP to form another interior shell 20.

Assembly frame 88 comprises a metal framework 90 which positions and rigidly supports a plurality of positioning pads 92. Positioning pads 92 are "negatives" of selected corners, edges and surfaces of cabin segment 86 and are supported within framework 90 in a configuration matching the external geometry of exterior shell 16 so the assembled cabin segment 86 is firmly supported and precisely positioned therein. Positioning pads 92 may be conveniently formed by molding FRP over the appropriate areas of exterior shell 16, or of the same exterior mock-up (not shown) of cabin 10 on which exterior shells 14,16 were produced. Assembly frame 88 is mounted on casters 94.

Substantially all of the work required to finish the interior of cabin segments 86,87 is completed while the cabin segments are mounted in their respective assembly frames 88. The relatively unrestricted access to the cabin segment interiors through their open sides simplifies and speeds the installation of appliances, lights, cabinet doors, upholstery, etc. Assembly frames 88 may be rolled between work stations within the factory where different assembly tasks are performed.

Joining the Cabin Segments

Figure 9:
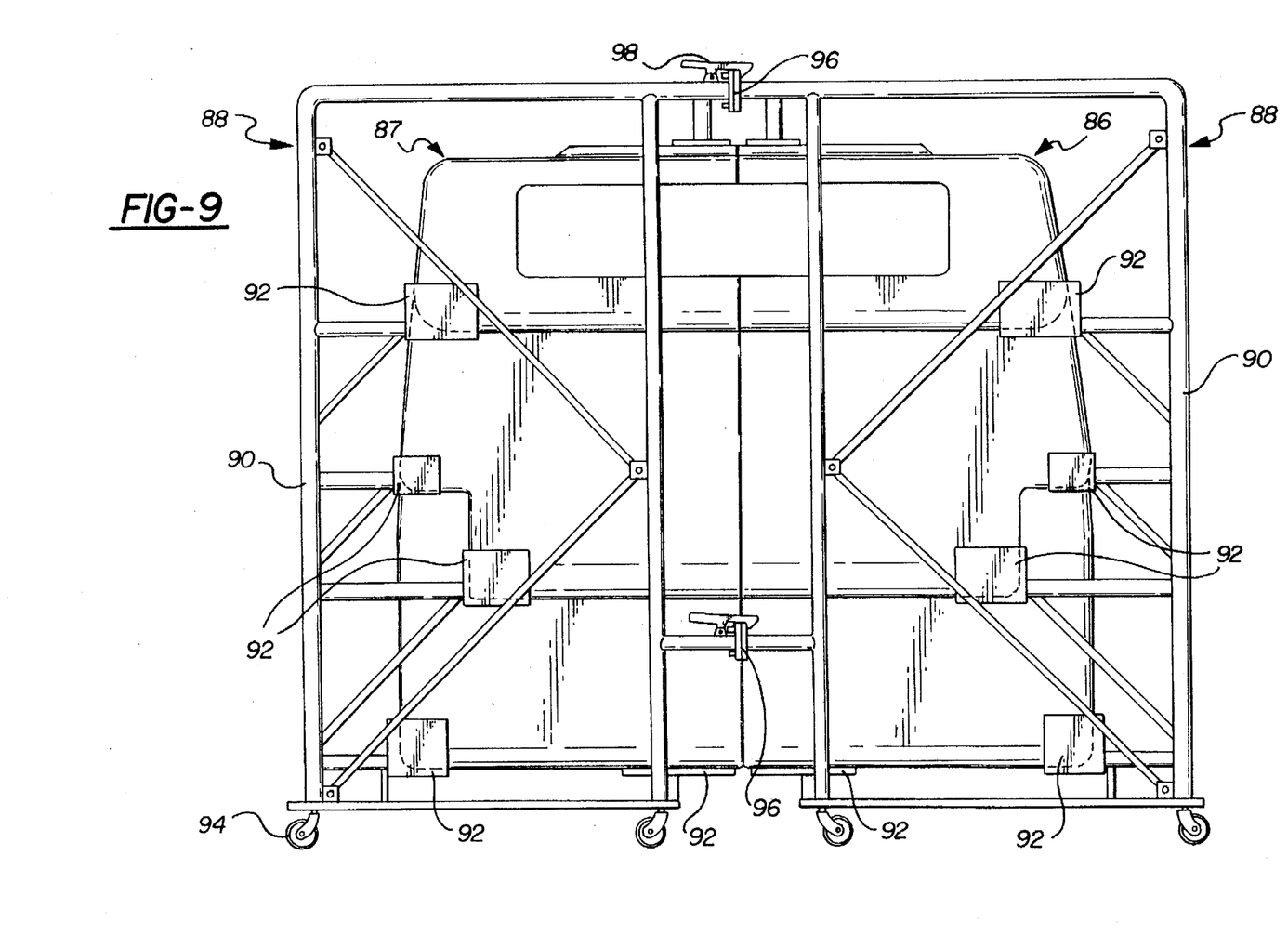
FIG. 9 is a head-on view of the right and left cabin segments in their respective assembly frames in position for joining of the segments.

Assembly frames 88 are rolled together to place the perimeters of the open sides of left and right cabin segments 86,87 in abutting registry with one another, as seen in FIG. 9. Alignment plates 96 attached to assembly frames 88 have cooperating pins and holes which engage one another to ensure proper alignment between the assembly frames, and clamps 98 are fastened to hold the frames securely together.

Figure 10:
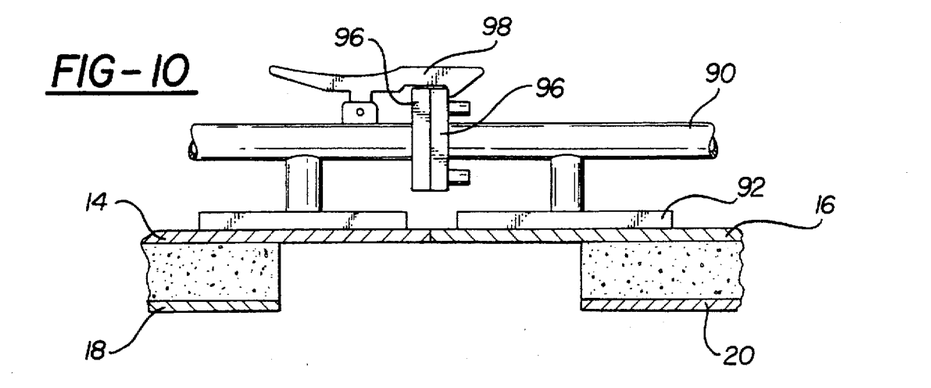
FIG. 10 is a detail of a cross-section through the right and left cabin segments in their respective assembly frames prior to the joining of the right and left segments.

As seen in FIG. 10, when the cabin segments are in abutting registry, only the peripheral edges of exterior shells 14,16 are actually in contact. The peripheral edges of interior shells 18,20 remain separated by a distance of approximately ten to twelve inches. The gap between interior shells 18,20 is filled and the left and right cabin segments 86,87 joined together by placing one or more layers of resin-impregnated fabric over the inner surfaces of exterior shell segments 14,16 which are exposed in the gap area, applying a layer of SPF on top of the FRP substantially fill the gap area, and then placing an FRP panel over the SPF in the gap area. Resin present in the un-cured FRP is drawn by capillary action into the seam between the edges of exterior shells 14,16 and bonds those shells together as the resin cures. Access to the interior of the cabin structure for this joining procedure is through the rear door opening of the cabin, and assembly frames 88 are designed so as not to obstruct the door opening.

Figures 11, 12:
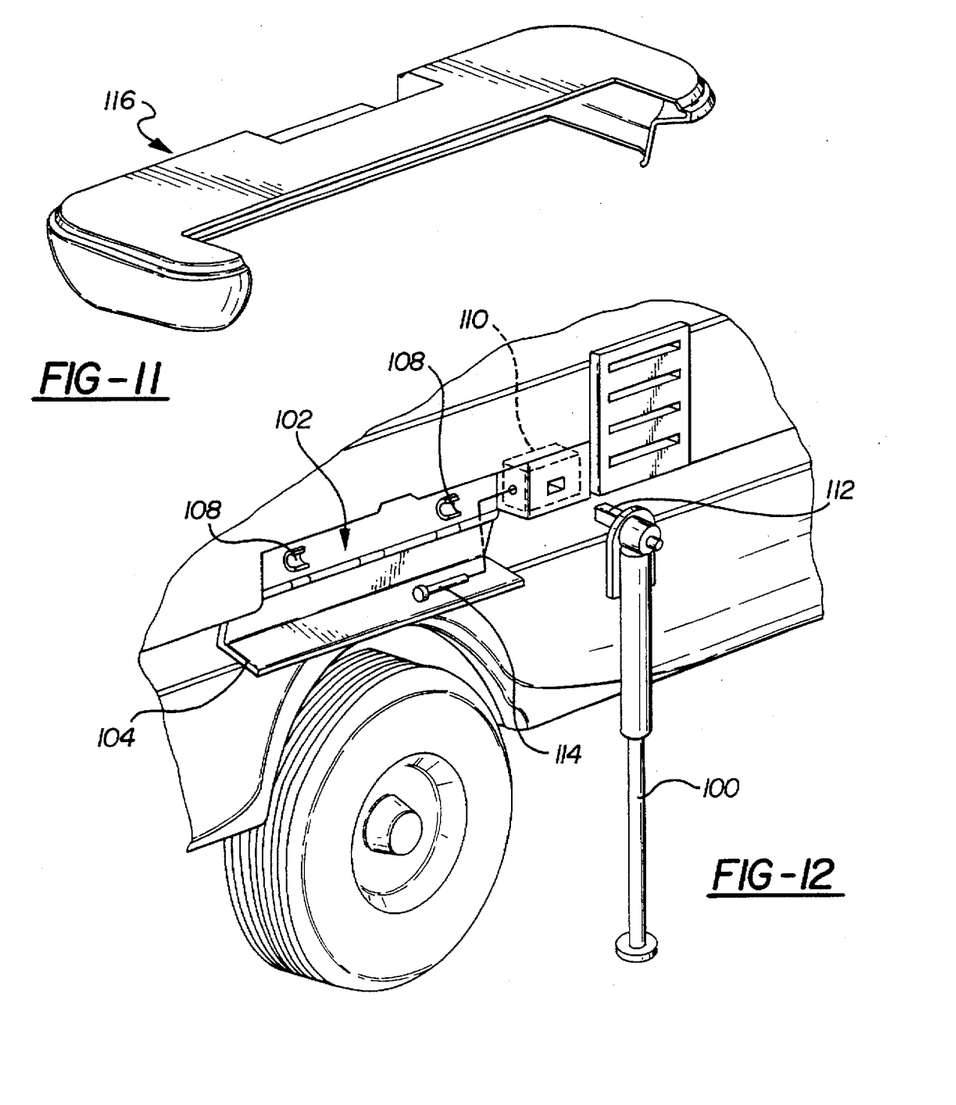
FIG. 11 is a perspective view of a holding tank cover.
FIG. 12 is a detail of the exterior of the cabin showing provisions for enclosed storage of a jack stand.

As is customary for pick-up truck campers, cabin 10 is provided with telescoping jack stands 100 which are used to support cabin 10 when it is not mounted on a pick-up truck. Three jack stands 100 are required to provide stable support for camper 10. In accordance with the present invention, jack stands 100 are carried inside of a pair of recessed compartments 102 formed along the lower, outside edges of right and left exterior shell segments 14, 16. FIG. 12 shows compartment 102 located on right exterior shell segment 14 and it should be understood that the following description applies identically to the compartment located on the left side, except that the left side compartment contains two jack stands.

Compartment 102 is covered by a molded door 104 which is attached to exterior shell segments 14 by hinge 106 and lies flush with the exterior of camper 10 when closed and latched. Jack stand 100 is retained for carriage inside of compartments 102 by latching means 108. Immediately adjacent to compartment 102 and internal to the camper 10 is a mounting bracket 110 by means of which jack stand 100 is attached to camper 10 when in use.

To mount jack stand 100 to the cabin, it is removed from compartment 102 and a mounting shaft 112 formed integrally with the upper end of the jack stand is inserted into mounting bracket 110. A locking pin 114 is inserted from the inside of compartment 102 to pass through aligned holes in mounting bracket 110 and mounting shaft 112 to secure jack stand 100 in a vertical position as shown in FIG. 12. Door 104 is then closed and latched and jack stand 100, along with the two jack stands on the opposite side of cabin 10, is extended to a length sufficient to lift camper 10 clear of pick-up truck 12. Pick-up truck 12 is then driven out from under camper 10 leaving it supported on jack stands 100. Additional jacks or blocks (not shown) may be placed under camper 10 to provide more complete support.

In the preferred embodiment of the invention, camper 10 also includes a molded FRP holding tank cover 116 which encloses and supports a holding tank (not shown) associated with a waste water toilet system (not shown). Because of its geometry, holding tank cover 116 cannot be formed as a single piece, but rather is molded in three separate pieces (see FIG. 11) which are then bonded together before being attached to the extreme rear underside of camper 10 by means of bolts (not shown). As is apparent in FIG. 1, holding tank cover 116 extends rearwardly beyond the rear surface of camper 10 and has a step 118 molded into its upper surface to assist passengers in entry and egress through the passenger door. Bolts are used to attach holding tank cover 116 to camper 10 so that it may be removed and reattached if necessary to repair or replace the holding tank which it encloses.

The invention claimed is:

1. A method of producing a recreational vehicle cabin by forming a right cabin segment and a left cabin segment and subsequently joining the segments into a unitary structure, the method comprising the steps of:

fabricating a right female mold and a left female mold;

forming a right exterior shell and a left exterior shell inside of the right and left female molds respectively;

fabricating a right male mold and a left male mold;

forming a right interior shell and a left interior shell on the right and left male molds respectively, the right and left interior shells shaped to fit inside of and match at least a portion of the inside contours of the right and left exterior shells respectively;

inserting the right male mold into the right female mold and the left male mold into the left female mold to position the interior shells substantially within their respective exterior shells;

securing the interior shells inside of the respective exterior shells to form right and left cabin segments, the cabin segments each having a perimeter;

removing the right and left cabin segments from the respective right and left female molds and male molds;

placing the right and left cabin segment perimeters in abutting registry with one another; and joining the right and left cabin segments together along the abutting perimeters.

2. The method of claim 1 wherein the placing step comprises the additional steps of:

mounting the right and left cabin segments on respective right and left assembly frames, the assembly frames supporting the cabin segments such that the perimeters thereof are in substantially vertical planes; and moving at least one of the frames relative to the other frame to place the perimeters of the right and left cabin segments in said abutting registry.

3. The method of claim 2 wherein the removing and mounting steps are accomplished by:

withdrawing the right and left male molds from the respective female molds such that the right and left cabin segments remain on the respective right and left male molds;

moving the right male mold relative to the right assembly frame and moving the left male mold relative to the left assembly frame to place the cabin segments on their respective assembly frames; and withdrawing the right and left male molds from the right and left cabin segments respectively and leaving the cabin segments mounted on their respective assembly frames.

4. The method of claim 1 wherein the inserting step positions at least one interior shell in spaced apart relation to its respective exterior shell to define spaces between proximate surfaces of the at least one interior shell and the respective exterior shell; and the securing step comprises injecting a quantity of fluid into the spaces, the fluid solidifying and bonding the at least one interior shell and the respective exterior shell together whereby the resulting cabin segment has walls at least portions of which consist of a core of the solidified fluid sandwiched between the interior and exterior shells.

5. The method of claim 4 further including the step of:
attaching electrical wiring to at least one interior shell before inserting the at least one interior shell into its desired position within its respective exterior shell.

6. The method of claim 4 further including the step of:
attaching plumbing to at least one interior shell before inserting the at least one interior shell into its desired position within its respective exterior shell.

7. The method of claim 4 further including the step of:
attaching a liner segment to the at least one interior shell before the inserting step, whereby the injected fluid fills spaces between the liner segment and the respective exterior shell.

8. The method of claim 4 wherein the placing step puts peripheral edges of the interior shells in spaced relationship to one another to define a gap between the right and left interior shells along at least a portion of the cabin segment perimeters, and the joining step comprises:

applying a layer of un-cured fiber-reinforced composite material to the inner surfaces of the exterior shells in the gap area;

applying a layer of fluid over the composite material in the gap area; and applying a substantially cured panel of fiber-reinforced composite material over the fluid layer, thereby extending the sandwich wall of the cabin segments on either side to fill the gap area.

9. The method of claim 4 wherein the interior shells and the exterior shells are made of a fiber-reinforced composite material and the fluid is a structural foam.

10. The method of claim 9 wherein the steps of forming the interior and exterior shells and securing the shells together are performed in a period of time substantially less than the time required for the fiber-reinforced composite to cure fully.

11. The method of claim 1 wherein the inserting step comprises placing first and second aligning means disposed on at least one of the male molds and at least one of the female molds respectively in engagement with one another to position the at least one male mold and the at least one female mold in a desired alignment relative to one another.

12. The method of claim 1 further including the steps of:
installing interior components within the right and left cabin segments prior to placing the cabin segments in said abutting registry.

* * * * *